(12) United States Patent
Bush et al.

(10) Patent No.: US 6,612,541 B2
(45) Date of Patent: Sep. 2, 2003

(54) CONTROL VALVE RETROFIT FOR PNEUMATIC PLUMBING FIXTURE

(75) Inventors: Shawn D. Bush, Seminole County, FL (US); Dennis L. Malone, Seminole County, FL (US)

(73) Assignee: I-CON Systems, Inc., Oviedo, FL (US)

( * ) Notice: Subject to any disclaimer, the term of this patent is extended or adjusted under 35 U.S.C. 154(b) by 27 days.

(21) Appl. No.: 10/038,631

(22) Filed: Jan. 3, 2002

(65) Prior Publication Data

US 2003/0122098 A1 Jul. 3, 2003

(51) Int. Cl.[7] ............................................. F16K 31/06
(52) U.S. Cl. .......................... 251/129.01; 251/129.04; 251/149.9
(58) Field of Search .................. 251/129.01–129.22, 251/149.9; 137/315.03

(56) References Cited

U.S. PATENT DOCUMENTS

| 4,971,287 A | | 11/1990 | Shaw ........................ 251/30.05 |
|---|---|---|---|
| 5,123,626 A | * | 6/1992 | Schlagmuller et al. . 251/129.02 |
| 5,129,619 A | * | 7/1992 | Castetter ................. 251/129.11 |
| 5,213,303 A | * | 5/1993 | Walker ................... 251/129.17 |
| 5,417,403 A | * | 5/1995 | Shurman et al. ....... 251/129.18 |
| 5,586,746 A | * | 12/1996 | Humpert ................ 251/129.04 |
| 6,019,343 A | * | 2/2000 | Tsai ....................... 251/129.04 |

* cited by examiner

Primary Examiner—Paul J. Hirsch
(74) Attorney, Agent, or Firm—Webb Ziesenheim Logsdon Orkin & Hanson, P.C.

(57) ABSTRACT

The present invention is a control valve having an adapter element. The adapter element has at least one adapter element fluid inlet and at least one adapter element fluid outlet and is sealingly engaged with and in fluid communication with a flow valve. The flow valve has a flow valve fluid inlet and a flow valve fluid outlet. The control valve also includes a plunger mechanism sealingly engaged with and in fluid communication with the adapter element. The plunger mechanism has a plunger element in operable communication with the adapter element fluid outlet. The adapter element is a unitary structure.

18 Claims, 4 Drawing Sheets

CONTROL VALVE RETROFIT FOR PNEUMATIC PLUMBING FIXTURE

BACKGROUND OF THE INVENTION

1. Field of the Invention

The present invention relates generally to control valves and, in particular, to control valves for use in connection with electronically-triggered flow valves and fluid control systems.

2. Description of the Prior Art

In most fluid control systems and, more particularly, water conduit systems, control valves are utilized to control the flow of water through the piping system. Such control valves are commonly used in connection with electronic control centers which contain sensor inputs to register a user's request for operation of the flow valve. It is these valves, typically solenoid-operated valves, that control the flow of water to the user. Such control valves have recently found use in prison lavatory and water closet systems.

In the area of prison lavatory and water closet systems, there is a need for a method and apparatus for converting manually-operated prison lavatory flow valves, which use pneumatic triggering and flow time mechanisms, with electronic solenoid-operable valves using electronic triggering and flow time means. A conventional pneumatic prison lavatory valve has a valve body with a water inlet and a water outlet. Such a conventional control valve uses a diaphragm in a metering passageway in fluid communication with the water inlet and the water outlet. The water outlet is selectively blocked and sealed by a plunger. The water is further controlled by a non-magnetic cap, which includes a vertical extending member. The plunger is moved into an unsealed position into the member by a donut-shaped permanent magnet. This magnet is separated from an upper chamber with a pneumatic inlet and outlet by a second flexible diaphragm. The user introduces pneumatic fluid into the chamber by a pneumatic piston push button which flexes the flexible diaphragm which, in turn, moves the donut-shaped magnet into magnetic communication with a plunger by encompassing the member. The pneumatic plunger push-button is filled with atmospheric pressure, as the piston returns to the original position. The first upper chamber is relieved of stored fluid, thus reducing the force holding the diaphragm in place, and allowing the first lower chamber fluid to raise the flexible diaphragm, thereby allowing fluid flow to occur through the water outlet. Simultaneously, the pneumatic fluid in the second upper chamber is exhausted relatively slowly through the pneumatic outlet, which is a tiny passage. As the pneumatic pressure in the pneumatic upper chamber nears atmospheric pressure, the magnet is moved out of magnetic communication with the plunger to its original position, allowing the plunger to block the diaphragm outlet and allow the water upper chamber to fill to capacity through a tiny metering hole. The flexible diaphragm then moves into its original position and water flow is stopped. This control valve and other prior art control valves, as discussed above, have numerous and separately functioning pieces. The assembly, maintenance and repair of a valve having many pieces is difficult, expensive and time-consuming.

The above-described prior art control valve requires the pneumatic upper chamber outlet and the pneumatic piston push button inlet so that the required time duration of the fluid flow to a user to wash his or her hands (or receive a drink, etc.) is achieved. Due to the impurities suspended within the surrounding air, the tiny inlet and outlet passages often clog or are reduced in size, causing the time duration of the water flow to be insufficient or to extend longer than required. Further, these impurities suspended within potable water cause the tiny metering hole to clog or to be reduced in size, thereby causing the time duration of the water flow to be insufficient or overly extended.

SUMMARY OF THE INVENTION

It is, therefore, an object of the present invention to provide a control valve having a minimum number of "pieces," thereby reducing expense and maintenance costs. It is another object of the present invention to provide a control valve which is simple in its installation and easy in its repair. It is a further object of the present invention to provide a control valve that does not require any significant plumbing alterations prior to its installation.

Accordingly, the present invention is directed to a control valve for use in connection with a flow valve having a flow valve inlet, a flow valve outlet, and a surface for fluid communication between the flow valve inlet and the flow valve outlet, such as is typically present in fluid control system. The control valve of the present invention includes an adapter element which is a unitary body, and includes a first end face adapted for engagement with the flow valve inlet at the surface for fluid communication between the flow valve inlet and the flow valve outlet, and an opposed second end face including an adapter element chamber. At least one adapter element fluid inlet and at least one adapter element fluid outlet independently extend between the first end face and the second end face. The adapter element fluid inlet is in fluid communication with the flow valve inlet at the first end face and with the adapter element chamber at the second end face, while the adapter element fluid outlet is in fluid communication with the flow valve outlet at the first end face and with the adapter element chamber at the second end face. The control valve further includes a plunger mechanism sealingly engaged with the adapter element at the second end face within the adapter element chamber. The plunger mechanism includes a plunger element in fluid communication with the adapter element fluid outlet, and is operable between an unsealed position in which fluid communication is permitted between the adapter element fluid outlet and the adapter element chamber, and a sealed position in which fluid communication is prevented between the adapter element fluid outlet and the adapter element chamber. The plunger mechanism is desirably electronically operated, such as by a solenoid mechanism, and may include a communication line for transmission of signals from an external source.

The control valve may further include an adapter fitting having at least one adapter fitting fluid inlet and at least one adapter fitting fluid outlet configured to be sealingly engaged with and in fluid communication with the adapter element chamber. A release mechanism may further be engaged with an outer surface of the adapter fitting, configured to disengage the adapter fitting from the adapter element.

The present invention further includes a kit for a flow control valve, which includes a flow valve having a flow valve inlet, a flow valve outlet, and a surface for fluid communication therebetween, an adapter element as described above in fluid communication with flow valve at the surface for fluid communication between the flow valve inlet and the flow valve outlet, and a plunger mechanism as described herein for alternatively permitting and preventing fluid communication between the adapter element and the flow valve.

The present invention, both as to its construction and its method of operation, together with additional objects and advantages thereof, will best be understood from the following description of the specific embodiments when read in connection with the accompanying drawings.

DETAILED DESCRIPTION OF THE PREFERRED EMBODIMENTS

Figure 1:
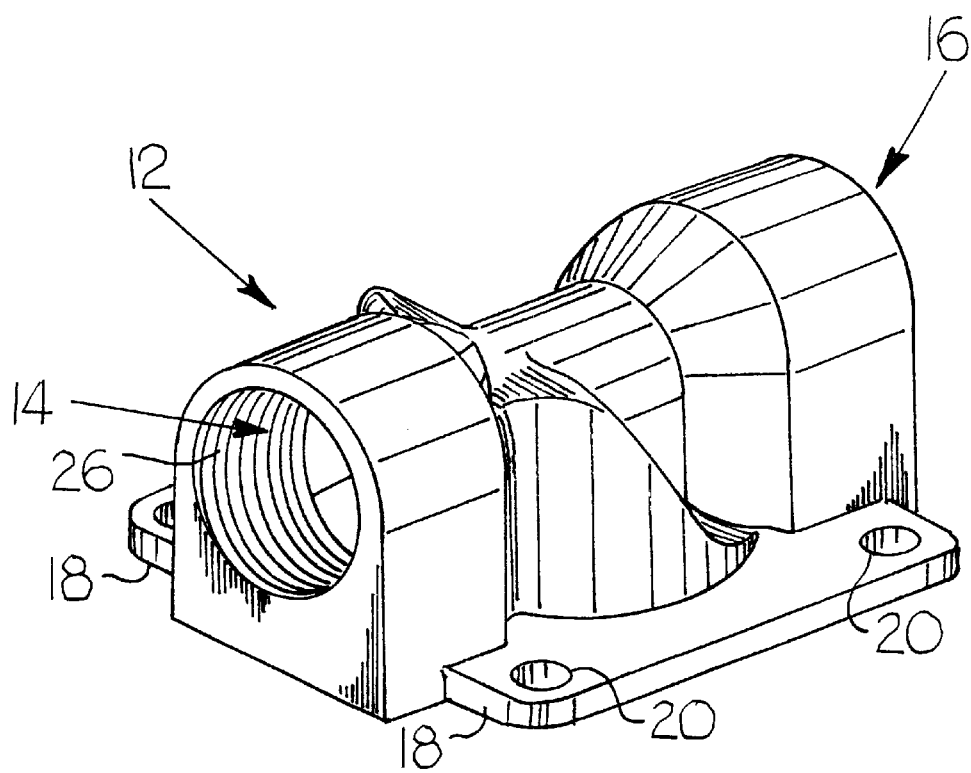
FIG. 1 is a perspective view of a typical prior art flow valve.
Figure 2:
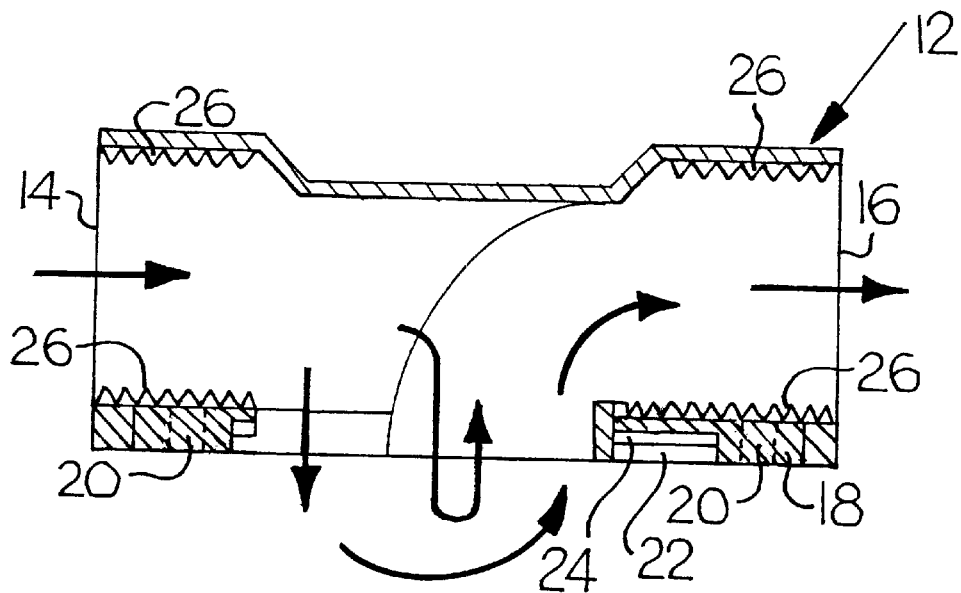
FIG. 2 is a side sectional view of the typical prior art flow valve of FIG. 1.

The present invention is a control valve 10 for use in connection with a flow valve 12. The flow valve 12 is of a type and variety that is commonly used in fluid piping systems and is illustrated in FIG. 1. Specifically, the flow valve 12 has a flow valve fluid inlet 14 and a flow valve fluid outlet 16. Further, the flow valve 12 has a flow valve rim 18 having multiple flow valve attachment mechanism orifices 20, typically four. The flow valve attachment mechanism orifices 20 are used to secure a control valve, in this instance control valve 10, to the flow valve 12. Normally, the flow valve attachment mechanism orifices 20 are adapted to be used in connection with a nut and bolt arrangement.

The flow valve 12 further includes a flow valve chamber 22 having a flow valve chamber groove 24. The flow valve chamber groove 24 is particularly adapted to receive an appropriately sized O-ring. Finally, both the typical flow valve fluid inlet 14 and flow valve fluid outlet 16 have inner walls with flow valve threads 26 disposed thereon. In operation, a plumber or other installer connects the appropriate piping to the flow valve fluid inlet 14 and the flow valve fluid outlet 16 via these flow valve threads 26.

Such a flow valve 12 is conventionally operated with a pneumatic control valve as discussed above. Activation of such a pneumatic control valve is accomplished through mechanical activation with a pneumatic fluid, such as air, which exerts pressure on a diaphragm to displace the diaphragm and provide fluid communication for water flow. The control valve 10 of the present invention is designed as a retrofit valve to replace the conventional fluid control valve within such a flow valve 12 for electronic control. Through the use of such a retrofit valve, the conventional flow valve 12 can be easily converted to electronic operation without the need for extensive plumbing reconfiguration.

Figure 3:
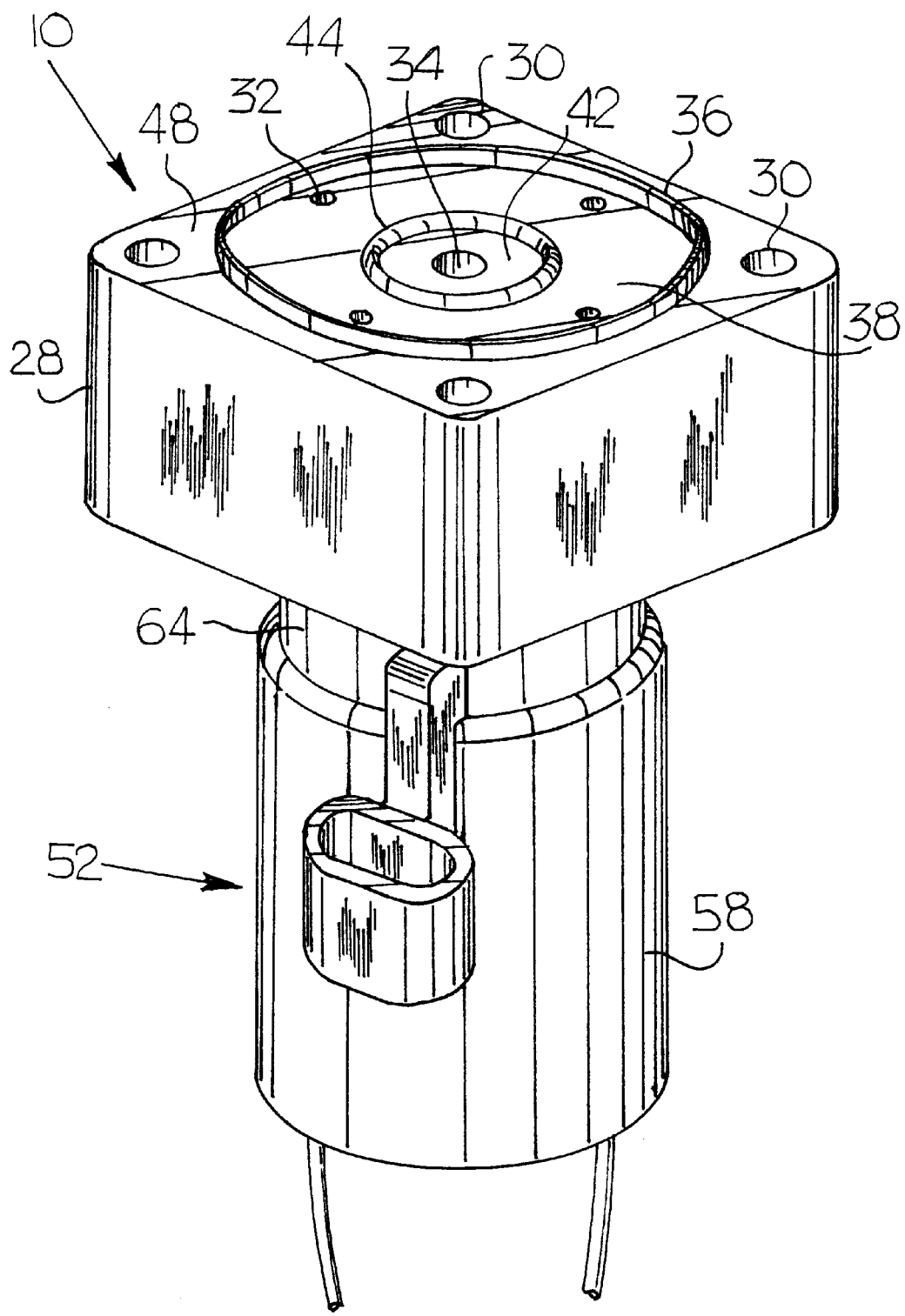
FIG. 3 is a perspective view of an adapter element of the control valve according to the present invention.
Figure 4:
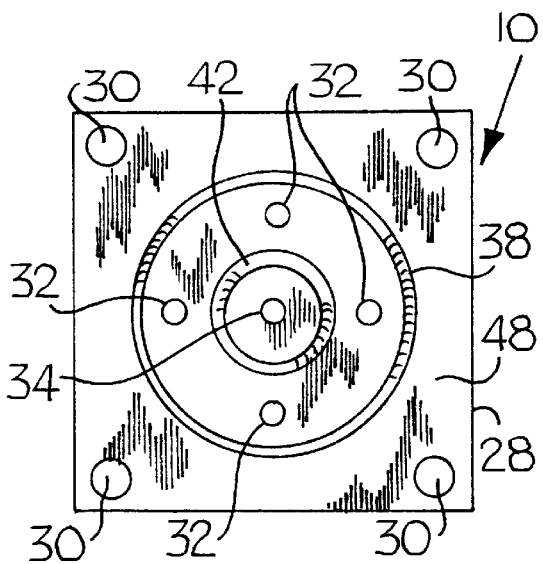
FIG. 4 is a top view of the adapter element in FIG. 3.
Figure 6:
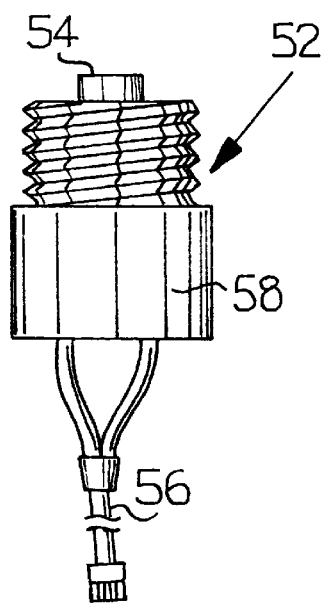
FIG. 6 is a side view of a plunger mechanism of the control valve according to the present invention.
Figure 5:
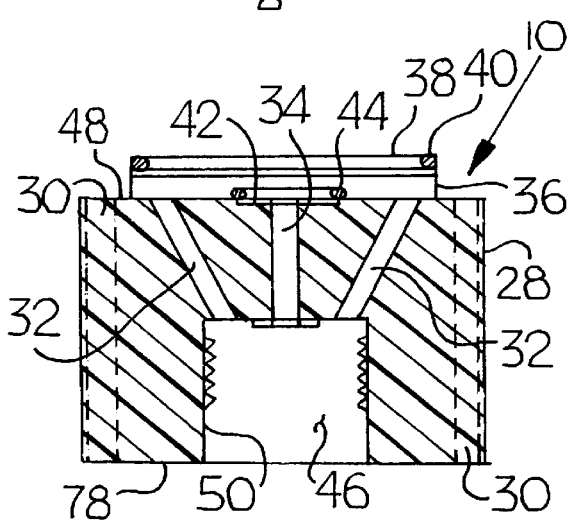
FIG. 5 is a side sectional view of the adapter element in FIG. 3.
Figure 7:
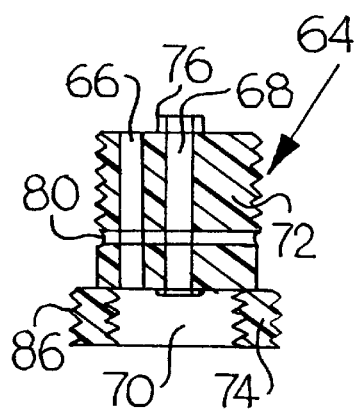
FIG. 7 is a side sectional view of an adapter fitting of the control valve according to the present invention.

In the present invention, control valve 10 includes an adapter element 28, as seen in FIGS. 3–5. As seen in FIG. 4, the adapter element 28 is a substantially square-shaped element, which is attachable to the above-described flow valve 12 at a first end face such as top surface 48. However, it is envisioned that the adapter element 28 can be manufactured in any shape that corresponds to differently-shaped flow valves 12. The adapter element 28 includes at least one adapter element attachment mechanism orifice 30 for use in conjunction with the flow valve attachment mechanism orifices 20. As described above, there are typically four adapter element attachment mechanism orifices 30 which align with the four flow valve attachment mechanism orifices 20, thereby allowing a bolt to be inserted therethrough. In this manner, the adapter element 28 is secured to the flow valve 12. The adapter element 28 also includes at least one adapter element fluid inlet 32 and at least one adapter element fluid outlet 34. When attached to the flow valve 12, the adapter element fluid inlet 32 is in fluid communication with the flow valve fluid inlet 14, such that fluid, typically water, may flow through the flow valve fluid inlet 14 and further through the adapter element fluid inlet 32. Similarly, the adapter element fluid outlet 34 is in fluid communication with the flow valve fluid outlet 16, thereby allowing flow through the adapter element fluid outlet 34 and through the flow valve fluid outlet 16 into the downstream piping.

The adapter element 28 has an adapter element ledge 36 adapted to mate with the corresponding flow valve chamber groove 24. The adapter element ledge 36 may also include an adapter element ledge groove 38 on an upper surface of the adapter element ledge 36. This adapter element ledge groove 38 is configured to accept a first O-ring 40 such that when the adapter element ledge 36 is mated with the corresponding flow valve chamber groove 24, the first O-ring 40 provides a water-tight seal at the juncture. Similarly, the adapter element 28 may include an adapter element face groove 42 surrounding the adapter element fluid outlet 34. As with the adapter element ledge groove 38, the adapter element face groove 42 is adapted to accept a second O-ring 44 therein. When the adapter element 28 is attached to the flow valve 12, the second O-ring 44 provides a water-tight seal between the adapter element fluid outlet 34 and the flow valve fluid outlet 16.

As seen in FIG. 5, the adapter element 28 includes a second end face at the adapter element 78 which has an adapter element chamber 46 extending partially into the adapter element 28. The adapter element chamber 46 is in fluid communication with the adapter element fluid inlet 32, as well as the adapter fluid outlet 34. Further, in a preferred embodiment, the adapter element fluid inlets 32 extend from an adapter element top surface 48 to the adapter element chamber 46 in an angular orientation, with respect to an adapter element chamber inner surface 50.

As seen in FIG. 4, the control valve 10 also includes a plunger mechanism 52 having a plunger element 54. Plunger mechanism 52 is desirably an electronically-controlled solenoid, as is known for use in conjunction with electronically-operated fixtures. The plunger element 54 is in operable communication with the adapter element fluid outlet 34. Whether directly or indirectly in contact with the adapter element fluid outlet 34, the plunger element 54 serves to permit or prevent fluid flow through the adapter element fluid outlet 34. In the preferred embodiment, the operable movement of the plunger element 54 is attained through a signal, which travels from a control center (not shown) through a plunger mechanism communication line 56, which is in communication with the plunger element 54. In addition, this plunger mechanism communication line 56 is at least partially encased in a plunger mechanism body 58, which is used to house the plunger mechanism 52 inner workings.

In operation, when the plunger element 54 is disengaged (i.e., no signal is emanating from the plunger mechanism communication line 56), the plunger element 54 is fully extended and blocks the adapter element fluid outlet 34. As such, when fluid enters the flow valve fluid inlet 14, fluid flows through the adapter element fluid inlet 32 and enters the adapter element chamber 46, the plunger element 54 blocks any flow through the adapter element fluid outlet 34, and, therefore, the flow valve fluid outlet 16. In this manner, no fluid exits the flow valve 12.

When an appropriate signal is sent through the plunger mechanism communication line 56, the plunger element 54 retracts, and allows fluid flow from the adapter element chamber 46 through the adapter element fluid outlet 34 and, in turn, through the flow valve fluid outlet 16. Fluid flow continues for the duration of retraction of plunger element 54. For example, plunger element 54 may remain retracted for a predetermined time period, or may remain retracted for as long as the appropriate signal continues to travel through the plunger mechanism communication line 56. However, once the signal ceases, the plunger element 54 again extends and blocks the adapter element fluid outlet 34, halting flow once more.

In a preferred embodiment, the plunger mechanism 52 includes a magnetic element 60 and a bias spring 62. The bias spring 62 urges the plunger element 54 to extend away from the plunger mechanism body 58. In this embodiment, when an appropriate signal is received through the plunger mechanism communication line 56, the magnetic element 60 is charged with enough of a magnetic field to overcome the bias spring 62 urge, thereby retracting the plunger element 54. As discussed above, when the signal ceases, the magnetic element 60 also ceases to have a magnetic field capable of overcoming the bias spring 62 urge. Therefore, the bias spring 62 once again urges the plunger element 54 to extend and block the adapter element fluid outlet 34.

Importantly, the adapter element 28 is manufactured as a unitary structure. For example, the adapter element 28 may be manufactured from an injection mold process utilizing a polymeric material. The unitary structure of the adapter element 28 is particularly desirable in that it does not require numerous smaller pieces in order to appropriately function. This is particularly advantageous in installing the control valve 10 or in maintaining it.

In another preferred embodiment, the control valve 10 also includes an adapter fitting 64 having at least one adapter fitting fluid inlet 66 and at least one adapter fitting fluid outlet 68. The adapter fitting 64 is configured to sealingly engage the adapter element chamber 46. In addition, the adapter fitting fluid inlet 66 is in fluid communication with the adapter element fluid inlet 32 and, likewise, the adapter fitting fluid outlet 68 is in fluid communication with the adapter element fluid outlet 34. This adapter fitting 64 provides an easy manner in which to attach the plunger mechanism 52 to the adapter element 28, yet still allow all of the fluid inlets and fluid outlets to connect.

The adapter fitting 64, like the adapter element 28, has an adapter fitting chamber 70, which is in fluid communication with both the adapter fitting fluid inlet 66 and the adapter fitting fluid outlet 68. However, when using the adapter fitting 64 in connection with the adapter element 28, the plunger element 54 of the plunger mechanism 52, while in operable communication with the adapter element fluid outlet 34, directly seals against the adapter fitting fluid outlet 68. In any case, since the adapter fitting fluid outlet 68 is in fluid communication with the adapter element fluid outlet 34 which is, in turn, in fluid communication with the flow valve fluid outlet 16, when the plunger element 54 engages the adapter fitting fluid outlet 68, flow is disallowed through the remaining fluid outlet passageways. Additionally, when using the adapter fitting 64, the plunger mechanism 52 is inserted into and attached to the adapter fitting 64 via the adapter fitting chamber 70.

The adapter fitting 64 also includes an adapter fitting body 72, an adapter fitting rim 74 and an adapter fitting ledge 76. In use, the adapter fitting body 72 is inserted into the adapter element chamber 46, such that the adapter fitting ledge 76 provides a direct and sealed fluid path through the adapter fitting fluid outlet 68 and into the adapter element fluid outlet 34. Further, the adapter fitting rim 74 extends below and abuts an adapter element base 78.

Regardless of the order in which they are attached, the flow valve 12, adapter element 28, adapter fitting 64 and plunger mechanism 52 are connected in series, such that fluid flow is continuous through all of the fluid passageways, with only one fluid outlet directly interacting with the plunger element 54. It is also envisioned that the adapter fitting 64 includes an adapter fitting groove 80 adapted to accept a third O-ring 82. When the adapter fitting 64 is inserted into the adapter element chamber 46, the third O-ring 82 ensures a water-tight seal between the adapter fitting 64 and the adapter element chamber 46.

The control valve 10 may also include a release mechanism 84. This release mechanism 84 is typically used in connection with the adapter fitting 64, and is engaged with an adapter fitting rim outer surface 86, such as through corresponding threaded engagement. The release mechanism 84 is attached to the adapter fitting rim outer surface 86 preferably in a non-permanent manner. Further, the release mechanism 84 has a release mechanism handle 88 to further assist in removing the adapter fitting 64 from the adapter element chamber 46 and/or from the plunger mechanism 52. In a preferred embodiment, the release mechanism 84 is manufactured in a tubular shape having an inner surface that is frictionally engageable with the adapter fitting rim outer surface 86. In operation, one need only rotate the release mechanism handle 88, and, due to the engagement between the release mechanism 84 and the adapter fitting rim 74, the entire adapter fitting 64 may be unthreaded from the adapter element 28. Release mechanism 84 provides a manual override feature to control valve 10. For example, when assembled, control valve 10 includes plunger mechanism 52 in a closed position, preventing fluid communication between the inlets and the outlets. Release mechanism 84 provides a simple device for manually releasing the attachment between adapter fitting 64 and plunger mechanism 52 by unscrewing adapter fitting 64 from plunger mechanism 52 through release mechanism 84, thereby releasing plunger element 54 from sealing engagement with adapter fitting fluid outlet 68, and establishing fluid communication between adapter fitting fluid inlet 66 and adapter fitting fluid outlet 68, thus permitting fluid flow through the valves. Such manual override is particularly useful during installation and troubleshooting of control valve 10. Control valve 10 can be closed by re-screwing adapter fitting 64 into plunger mechanism 52 through release mechanism 84.

While any manner of attachment between the various elements is envisioned, it is preferable to use threaded engagements by and between all of the flow valve 12, adapter element 28, adapter fitting 64, release mechanism 84 and plunger mechanism 52. In using such a threaded engagement between the elements, control valve 10, and its various components, are easy to both install and remove from each other and from the flow valve 12.

Figure 8:
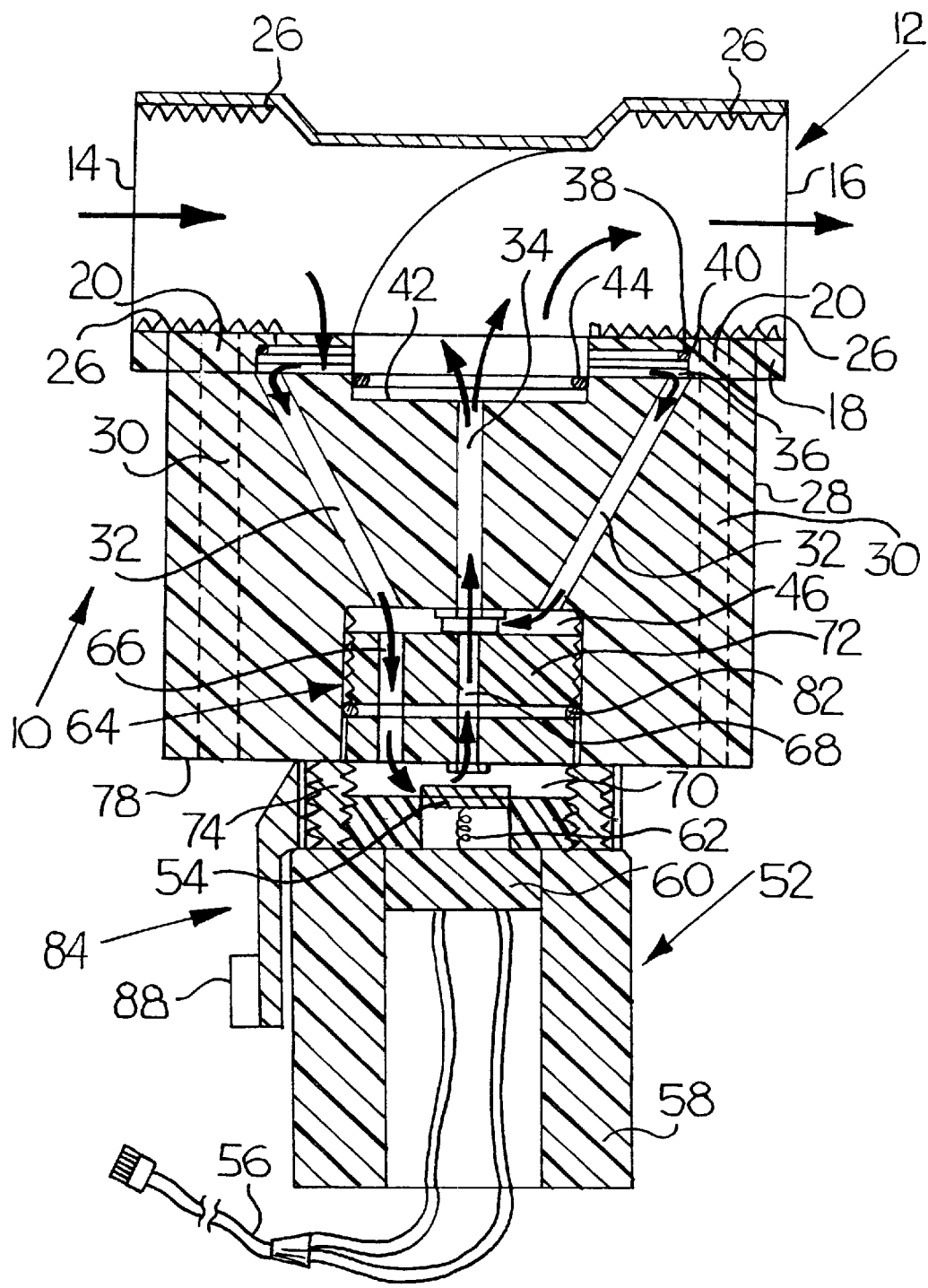
FIG. 8 is a side sectional view of a preferred embodiment of a control valve of the present invention as attached to a typical prior art flow valve.

As seen in FIG. 8, when using the preferred embodiment of the control valve 10, fluid flows through the flow valve fluid inlet 14, into the flow valve chamber 22, through the adapter element fluid inlets 32, into the adapter element chamber 46, through the adapter fitting fluid inlet 66, and into the adapter fitting chamber 70. In operation, a user activates a fixture such as a sink, for example, by activating an infrared sensor on the sink. The infra-red sensor sends a signal, preferably through a control unit which, in turn, communicates to the solenoid operated plunger mechanism 52 through the plunger mechanism communication line 56. The signal causes operation of the plunger mechanism 52, in which the plunger element 54 is retracted, allowing the fluid to flow through the adapter fitting fluid outlet 68, through the adapter element fluid outlet 34, and through the flow valve fluid outlet 16 into the piping system. When the signal stops, the plunger element 54 engages the adapter fitting fluid outlet 68 preventing any flow through the remaining fluid outlet passageways.

The present invention is simple in its use and easy in its manufacture. The unitary structure of the adapter element 28 drastically reduces both installation and maintenance time and expense. Overall, the present invention is equally useful in new installations, when the flow valve and the control valve are provided as a kit of parts, as well as in retrofit situations where the control valve is installed in connection with an existing flow valve.

This invention has been described with reference to the preferred embodiments. Obvious modifications and alterations will occur to others upon reading and understanding the preceding detailed description. It is intended that the invention be construed as including all such modifications and alterations.

The invention claimed is:

1. A control valve for use in connection with a flow valve having a flow valve inlet, a flow valve outlet and a surface for fluid communication between the flow valve inlet and the flow valve outlet, the control valve comprising:
   a) an adapter element including a unitary body comprising:
      i) a first end face adapted for engagement with the flow valve inlet at the surface for fluid communication between the flow valve inlet and the flow valve outlet;
      ii) an opposed second end face including an adapter element chamber;
      iii) at least one adapter fluid inlet extending between the first end face and the second end face, the adapter fluid inlet in fluid communication with the flow valve inlet at the first end face and with the adapter element chamber at the second end face; and
      iv) at least one adapter element fluid outlet extending between the first end face and the second end face, the adapter fluid outlet in fluid communication with the flow valve outlet at the first end face and with the adapter element chamber at the second end face; and
   b) a plunger mechanism sealingly engaged with the adapter element at the second end face within the adapter element chamber, the plunger mechanism having a plunger element in fluid communication with the adapter element fluid outlet and being operable between an unsealed position in which fluid communication is permitted between the adapter element fluid outlet and the adapter element chamber, and a sealed position in which fluid communication is prevented between the adapter element fluid outlet and the adapter element chamber.

2. The control valve of claim 1, wherein the adapter element further comprises at least one attachment mechanism orifice for securely attaching the adapter element to the flow valve via a fastening mechanism.

3. The control valve of claim 1, wherein the plunger mechanism comprises a solenoid mechanism.

4. The control valve of claim 1, wherein the adapter element fluid inlet extends from the first end face of the adapter element to the adapter element chamber in an angular orientation, with respect to an inner surface of the adapter element chamber.

5. The control valve of claim 1, further comprising an adapter fitting having at least one adapter fitting fluid inlet and at least one adapter fitting fluid outlet and configured to be sealingly engaged with and in fluid communication with the adapter element chamber.

6. The control valve of claim 5, wherein the adapter fitting further comprises an adapter fitting chamber in fluid communication with the at least one adapter fitting fluid inlet and the at least one adapter fluid fitting outlet.

7. The control valve of claim 5, wherein the adapter fitting further comprises an adapter fitting groove configured to accept an O-ring, wherein the O-ring sealingly engages the inner surface of the adapter element chamber.

8. The control valve of claim 5, wherein the plunger mechanism is configured to sealingly engage the adapter fitting, such that the plunger element is in operable communication with the at least one adapter fitting fluid outlet.

9. The control valve of claim 5, further comprising a release mechanism engaged with an outer surface of the adapter fitting and configured to disengage the adapter fitting from the adapter element.

10. The control valve of claim 9, wherein the release mechanism further comprises a release mechanism handle.

11. The control valve of claim 1, wherein the adapter element further comprises an adapter element ledge on the first end face configured to mate with a corresponding flow valve chamber groove on the surface of the flow valve.

12. The control valve of claim 11, wherein the adapter element ledge further comprises an adapter element ledge groove configured to accept an O-ring.

13. The control valve of claim 1, wherein the adapter element further comprises an adapter element face groove configured to accept an O-ring.

14. The control valve of claim 1, wherein the adapter element is injection molded from a polymeric material.

15. The control valve of claim 1, wherein the plunger mechanism further comprises a communication line configured to transmit a signal from an external source to the plunger mechanism.

16. The control valve of claim 1, wherein the adapter element comprises four adapter element fluid inlets equally spaced on the first end face of the adapter element and extending to the adapter element chamber, the adapter element chamber in fluid communication with the adapter element fluid inlets and the at least one adapter element fluid outlet.

17. A control valve for use in connection with a flow valve having a flow valve inlet, a flow valve outlet, and a surface for fluid communication between the flow valve inlet and the flow valve outlet, the control valve comprising:
   a) an adapter element including a unitary body comprising a first end face adapted for engagement with the flow valve inlet at the surface for fluid communication between the flow valve inlet and the flow valve outlet, and an opposed second end face including an adapter element chamber, the adapter element further including at least one adapter fluid inlet extending between the first end face and the second end face, the adapter fluid inlet in fluid communication with the flow valve inlet at the first end face and with the adapter element chamber at the second end face, and at least one adapter element fluid outlet extending between the first end face and the second end face, the adapter fluid outlet in fluid communication with the flow valve outlet at the first end face and with the adapter element chamber at the second end face;

b) an adapter fitting sealingly engaged with and extending within the adapter element chamber and having at least one adapter fitting fluid inlet, at least one adapter fitting fluid outlet, and an adapter fitting chamber in fluid communication with the adapter element chamber;

c) a plunger mechanism sealingly engaged with the adapter fitting within the adapter fitting chamber, the plunger mechanism having a plunger element configured to permit or prevent fluid flow through the adapter element fluid outlet through operable communication between an unsealed position in which fluid communication is permitted between the adapter fitting fluid outlet and the adapter fitting chamber and a sealed position in which fluid communication is prevented between the adapter fitting fluid outlet and the adapter fitting chamber; and d) a release mechanism engaged with an outer surface of the adapter fitting and configured to disengage the adapter fitting from the adapter element.

18. A kit for a flow control valve comprising:

a) a flow valve having a flow valve inlet, a flow valve outlet and a surface for fluid communication between the flow valve inlet and the flow valve outlet;

b) an adapter element including a unitary body comprising a first end face adapted for engagement with the flow valve inlet at the surface for fluid communication between the flow valve inlet and the flow valve outlet and an opposed second end face including an adapter element chamber, the adapter element further including at least one adapter fluid inlet extending between the first end face and the second end face, the adapter fluid inlet in fluid communication with the flow valve inlet at the first end face and with the adapter element chamber at the second end face, and at least one adapter element fluid outlet extending between the first end face and the second end face, the adapter fluid outlet in fluid communication with the flow valve outlet at the first end face and with the adapter element chamber at the second end face; and c) a plunger mechanism sealingly engaged with the adapter element at the second end face within the adapter element chamber, the plunger mechanism having a plunger element in fluid communication with the adapter element fluid outlet and being operable between an unsealed position in which fluid communication is permitted between the adapter element fluid outlet and the adapter element chamber, and a sealed position in which fluid communication is prevented between the adapter element fluid outlet and the adapter element chamber.

* * * * *